United States Patent
Hedegaard

(10) Patent No.: US 7,479,224 B2
(45) Date of Patent: Jan. 20, 2009

(54) PURIFICATION PLANT TO BIOLOGICALLY PURIFY WASTE WATER

(75) Inventor: Henrik Ulf Hedegaard, Fakse (DK)

(73) Assignee: KWH Pipe (Danmark) AS, Svinninge (DK)

( * ) Notice: Subject to any disclaimer, the term of this patent is extended or adjusted under 35 U.S.C. 154(b) by 167 days.

(21) Appl. No.: 10/487,064

(22) PCT Filed: Sep. 3, 2002

(86) PCT No.: PCT/DK02/00572

§ 371 (c)(1),
(2), (4) Date: Feb. 18, 2004

(87) PCT Pub. No.: WO03/020650

PCT Pub. Date: Mar. 13, 2003

(65) Prior Publication Data
US 2004/0173524 A1 Sep. 9, 2004

(30) Foreign Application Priority Data

Sep. 3, 2001 (DK) ............... 2001 01292
Oct. 5, 2001 (DK) ............... 2001 01463
Oct. 25, 2001 (DK) ............... 2001 01569

(51) Int. Cl.
C02F 3/00 (2006.01)

(52) U.S. Cl. .............. 210/220; 210/620; 210/629; 210/916

(58) Field of Classification Search ........... 210/620, 210/629, 631, 220, 916
See application file for complete search history.

(56) References Cited

U.S. PATENT DOCUMENTS

| 3,764,523 A | 10/1973 | Stankewich |
| 3,976,568 A | 8/1976 | Torpey |
| 5,415,681 A * | 5/1995 | Baker .......................... 95/45 |

FOREIGN PATENT DOCUMENTS

DE 197 20 983 A 11/1998

* cited by examiner

Primary Examiner—Chester T Barry
(74) Attorney, Agent, or Firm—Birch, Stewart, Kolasch & Birch, LLP

(57) ABSTRACT

A method of biologically purifying waste water, said method including the following steps in the following sequence a) an aeration step for stripping off $H_2S$ and other gases and for removing bactericides from the water, b) a step of decomposing organic matter, c) a sludge precipitation step, d) a clarification step and e) a nitrification step followed by a completing secondary settling step. This method is carried out in a plant, preferably a mini purification plant of the type "immersed aerated bio filter plant" for purifying waste water from households without connection to a sewage system. The plant includes an aerated settling tank (1), a unit for decomposing organic matter (2), a first sludge precipitation unit (5), a nitrification unit (8) and a completing sludge settling unit (5'). The primary settling unit includes means for providing aeration.

In this manner, it is rendered possible to obtain such an improved nitrification that it is possible to keep well below the limits stipulated by the authorities for the ammonia/ammonium content in waste water.

4 Claims, 2 Drawing Sheets

PURIFICATION PLANT TO BIOLOGICALLY PURIFY WASTE WATER

TECHNICAL FIELD

The present invention relates to a method of biologically purifying waste water and a plant to be used by the method. The plant according to the invention is in particular a mini purification plant of the type "immersed aerated bio filter plant" and is characterised in that the decomposition of organic matter and the decomposition of ammonium/ammonia are carried out in two or more sections divided by a precipitation chamber, and in that said plant further includes an aerated primary settling tank.

BACKGROUND ART

Several private households are not connected to the public sewage system and associated purification plants, and they use various types of mini purification plants for processing the waste water. Such mini purification plants are often simple "septic tanks" using anaerobic fermentation at low temperatures which is a slow process and where the outlet often ends in a cesspool, viz. a particular type of receptacle from which the water gradually percolates into the surrounding layers of soil. In Denmark, more than 300,000 houses suitable for use throughout the year process the waste water solely by means of septic tanks. However, the plants can also be of the type "immersed aerated bio filter plant", several different types thereof being available on the market. All of the latter types share the feature of having the entire biological process carried out in a single section which results in unpractical operation and sometimes in substantial variations in efficiency. Specifically, it is often impossible to meet the requirements presented to the nitrification of the purified waste water, viz. to an increased organic purification.

The above is due to the fact that the nitrifying autotrophic bacteria constantly compete with the heterotrophic bacteria, viz. bacteria using organic matter as a carbon source, and to the fact that the autotrophic bacteria therefore have difficulties in surviving because they grow substantially slower than the heterotrophic bacteria, viz. suffer from a long half-life, and by a much lower yield constant. The heterotrophic bacteria produce approximately 10 times as much sludge per energy unit as the nitrifying bacteria. This sludge takes up much space sand further increases the space competition additionally.

When observing the flow of water through a bio filter, it is obvious that the heterotrophic bacteria are the first bacteria to colonise at the beginning of the filter. Whether or not space is left for the nitrifying bacteria depends on the concentration of organic matter in the inlet of the bio filter.

The present invention is based on the assumption that it is possible to improve the conditions for the nitrifying bacteria by separating the step of decomposing organic matter from the nitrifying step in a method of biologically purifying waste water. A simultaneous preliminary aeration for stripping off $H_2S$ and other gases renders it possible to obtain an improved purification of the waste water in the biological steps of the process. Often, the gases formed in the anaerobic section of a septic tank have an inhibiting effect on the biological purification of the waste water. When carrying out the method according to the invention in pilot scale, it turned out that the pH-value increases across the plant when a preliminary aeration is carried out rather than decreases as expected due to the nitrification. Such a processing can only be explained by the fact that an acid is removed by the aeration process and the fact that said acid is $H_2S$. Therefore an improved biological activity is obtained in the subsequent step where the water is now at least partly purified of $H_2S$. Thus, by aerating the water and thereby stripping off $H_2S$ and other gases it is rendered possible to obtain an improved purification of the waste water in the biological section of the mini purification plant. In addition, it is rendered possible to remove the many bactericides, viz. chlorine, acetone etc., which can be present in waste water discharged from households whereby the bacterial flora of the system is subjected to a lenient processing and thereby kept efficient.

DETAILED DESCRIPTION OF THE INVENTION

Figure 1:
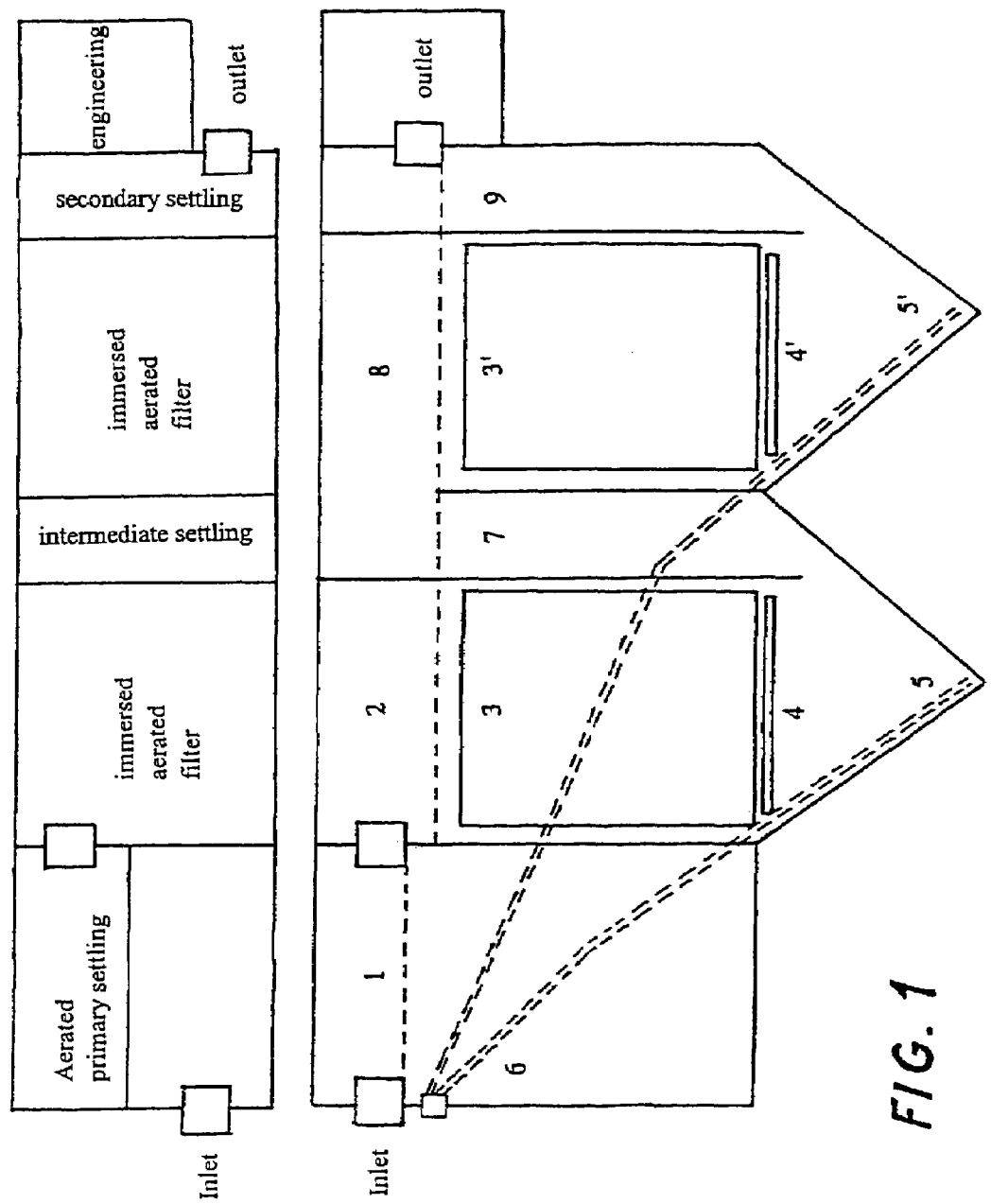
FIG. 1. is a plan view of a purification plant according to the invention.
Figure 2:
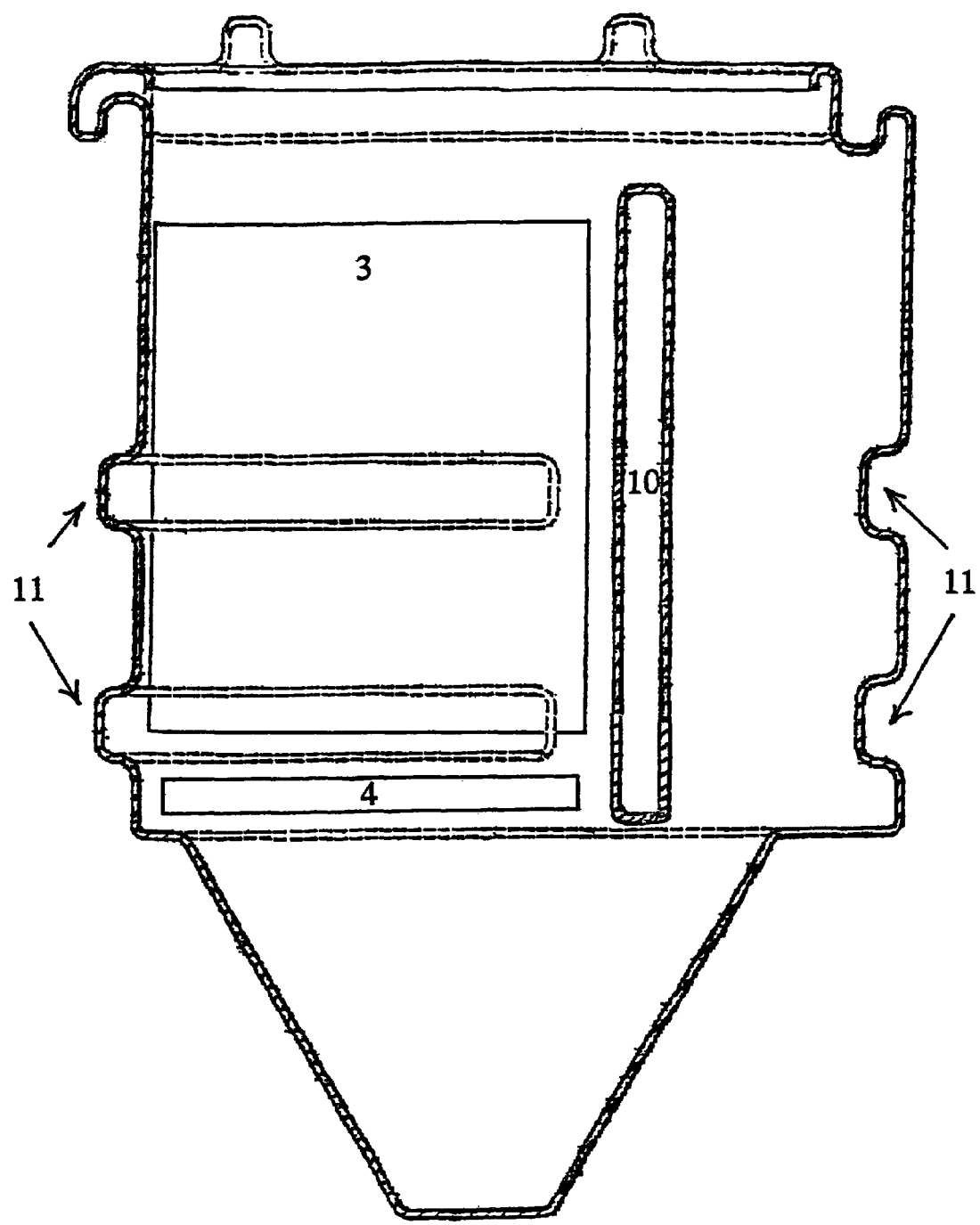
FIG. 2. illustrates a plant unit according to the invention.

Thus, the invention relates to a method of biologically purifying waste water, said method including the following steps in the following sequence:
a) a step of decomposing organic matter
b) a sludge precipitation step
c) a clarification step and
d) a nitrification step followed by a completing secondary clarification step, and the method according to the invention is characterised in that it prior to step a) includes $a_0$) an aeration step for stripping off $H_2S$ and other gases and for removing bactericides from the water.

In principle, it is known to split the biological purification of waste water into several steps: cf. for instance "Spildevandsrensning, biologisk og kemisk" (The purification of waste water, biologically and chemically) 2. edition, Polyteknisk Forlag, 1992, pages 202-204. Such a procedure is also disclosed in U.S. Pat. No. 3,764,523 and in EP patent application No. 0 002 008, both relating to methods of biologically purifying waste water. These methods include a step of decomposing organic matter, a sludge precipitation step, a nitrification step and a completing secondary settling step. However, these known methods of processing BOD-containing waste water do not relate to mini purification plants, on the contrary they relate to large plants, such as municipal purification plants where the problems generally differ from those of small plants due to the very large quantities of water.

Also, it is in principle known to aerate waste water, which is to be purified, in a primary settling tank prior to the actual biological purification.

However, the method according to the invention differs from the known methods by including a preliminary aeration step for stripping off $H_2S$ and other gases and for removing bactericides from the water and it is both surprising and unexpected that it is possible to obtain an improved nitrification being so significant that it is possible to get well below the limits stipulated by the authorities for the ammonia/ammonium content in purified waste water (the limit in Denmark is 5.0 mg/liter).

The invention relates furthermore to a plant, in particular a mini purification plant of the type "immersed aerated bio filter plant" to be used by said method. This plant includes an aerated primary settling unit, a unit for decomposing organic matter, a first sludge precipitation unit, a nitrification unit and a completing sludge settling unit. The primary settling unit includes means for providing aeration.

According to a particularly preferred embodiment, the plant according to the invention is a mini purification plant of the type referred to as an immersed bio filter plant, and in the preferred embodiment of this invention said plant has a capacity of between 5 and 30 population equivalents (PE). In such a plant, the biological section is divided and separated by a precipitation chamber resulting in a very reliable purification process because the nitrifying bacteria are given "their own" bio filter section, so to speak, subsequent to the steps of decomposing organic matter and precipitating sludge. In this manner, the concentration of organic matter in the inlet of the subsequent chamber has been heavily reduced. As a result, significantly improved conditions are obtained in the plant and thereby a further improved and efficient purification is obtained. preferred mini purification plant is between 50 liters and 25 m³. The interior of the tank is divided into a purification section and a settling section by means of a partition 10, a pipe or the like means not extending to the bottom of the tank where the purification section includes a bio filter 3. At the bottom of the tank, a diffusor 4 or the like means is positioned for distributing the air provided in the waste water contained in the tank.

Such an individual tank can also be used for precipitating phosphorus as it is advantageous to separate the removal of phosphorus from the biological purification so as to avoid contact between the precipitation chemicals used for the precipitation of phosphorus and the biological section of the purification plant.

The object of the aerated primary settling tank 1 is to remove the gases formed in the anaerobic section of a septic tank or the like by way of stripping because these gases have an inhibiting effect on the biological purification of the waste water. When such gases are stripped, a substantially improved purification of the waste water is obtained in the biological section of the mini purification plant. In addition, as previously mentioned, it is rendered possible to remove the many bactericides, viz. chlorine, acetone etc., which can be present in waste water from households and which have a strongly inhibiting effect on the bacteria in the subsequent biological purification step if they are not removed.

The primary settling tank 1 can be of any shape, such as circular or edged, and can be made of plastics, metal, glass fibre, concrete or other types of materials. A typical volume of the tank for use in connection with the above preferred mini purification plant is between 50 liters and 25 m³. The interior of the tank is divided by means of a partition, a pipe or the like means not extending to the bottom of the tank. At the bottom of the tank, a diffusor or the like means is positioned for distributing the air provided in the waste water contained in the tank.

The structure of this preferred mini purification plant is illustrated in the Figure from which it appears that the plant includes an aerated primary settling tank 1 and a primary chamber 2 having an immersed bio filter 3. This bio filter is aerated by a diffuser 4 positioned beneath the filter unit Concurrently, the diffusor provides circulation of the waste water through the filter in such a manner that contact is established between the waste water and the bacteria on the filter skin. A settling tank 5 collects the sludge from the biological process. This sludge is fed back into the primary settling tank 1 by means of a pump system, preferably an airlift pump 6.

The partly purified waste water is then carried through a vertical settling tank 7 to the secondary chamber 8. Like the primary chamber 2, this chamber 8 is equipped with an immersed bio filter 3' aerated by a diffusor 4' which is positioned beneath the filter unit, as well as with a settling tank 5' collecting the sludge.

It is important that an intermediate precipitation is carried out in the first settling tank 5 because the quantities of water are small and because sludge must not be transferred to the nitrification step.

The waste water now purified is then carried through a secondary settling tank 9 and through an outlet to the recipient.

The embodiment illustrated in the Figure is integrated in such a manner that it includes integrated units. However, it is also possible to structure the plant of several separate units which can be integrated and replaced individually. This embodiment renders it possible to replace individual sections of the plant or expand the plant in a simple and convenient manner, for instance to satisfy a need for increased capacity in form of more population equivalents (PE). The advantages thereof are obvious.

The individual tanks in the plant can be made of plastics, metal, glass fibre, concrete or other types of materials. A typical volume of a tank for use in connection with the Typically, the diffusor 4 yields an air volume of between 10 and 100 liters of air per minute per 100 liters of vessel volume.

The waste water to be purified and for example deriving from a septic tank is carried through an opening at the top of one of the chambers of the tank. After aeration the waste water is carried further to the primary chamber 2 of the mini purification plant through an opening at the top thereof. In the settling tank 5 the sludge is precipitated by way of sedimentation whereafter the sludge, as mentioned previously, is fed back into the primary settling tank 1 by way of pumping.

The aerated primary settling tank can also be used together with other types of biological purification plants, such as percolation plants, biological sand filters, willow purification plants etc.

The invention is illustrated in greater detail by means of the following example.

EXAMPLE

A mini purification plant as illustrated in the Figure, but without the primary settling tank 1, was mounted on 4 Sep. 2001, viz. day 0, for providing purification of waste water from a septic tank. After 14 days of running-in time, measurements showed the following results (all measurements of ammonium, COD and BI5 are stated in mg/liter):

|  |  | Day | | | |
| --- | --- | --- | --- | --- | --- |
| Measuring site |  | 15 | 19 | 22 | 24 |
| Inlet | pH | 7.38 | 7.45 | 7.45 | 7.46 |
|  | ammonium | 43.8 | 47.2 | 49.9 | 44.8 |
|  | COD | 74.5 | 71.9 | 70.9 | 73.6 |
| Intermediate settling | pH | 7.78 | 8.29 | 7.98 | 7.86 |
|  | ammonium | 46.8 | 39.9 | 41.2 | 43.9 |
|  | COD | 73.0 | 77.0 | 76.3 | 76.0 |
| Outlet | pH | 8.19 | 8.42 | 8.30 | 8.04 |
|  | ammonium | 40.1 | 40.9 | 36.6 | 37.3 |
|  | COD | 75.3 | 58.3 | 62.1 | 76.5 |

Following the above measurements, an aeration well was mounted on day 24, viz. 28 Sep. 2001, between the septic tank and the inlet. This aeration well was a tank having a volume of 275 liters aerated by a blower providing 40 liters of air per minute. Subsequently the following results were measured on 3 Oct. 2001, viz. day 30:

| Measuring site | | Day 30 |
|---|---|---|
| Inlet | pH | 8.27 |
| | ammonium | 45.4 |
| | COD | 70.9 |
| Intermediate settling | pH | 7.84 |
| | ammonium | 40.2 |
| | COD | 76.5 |
| Outlet | pH | 7.60 |
| | ammonium | 4.05 |
| | COD | 76.8 |

On 5 Oct. 2001, viz. day 32, the sulfide content was measured before and after the aeration well. The following results were registered: Septic tank: 23.4 mg/l; Inlet 0.987 mg/l.

Subsequently, the water samples are collected from the septic tank, the intermediate settling tank and the outlet. The following results were registered:

| Measuring site | | Day | | | | |
|---|---|---|---|---|---|---|
| | | 33 | 34 | 35 | 36 | 37 |
| Septic tank | pH | 7.53 | 7.56 | 7.47 | 7.43 | 7.49 |
| | ammonium | 53.1 | 55.4 | 61.1 | 66.9 | 70.3 |
| | COD | 72.3 | 65.3 | 67.0 | 63.4 | 62.3 |
| Intermediate settling | pH | 8.08 | 8.09 | 8.12 | 8.00 | 8.01 |
| | ammonium | 40.7 | 40.9 | 39.5 | 40.6 | 36.6 |
| | COD | 60.5 | 63.0 | 66.2 | 76.7 | 74.1 |
| Outlet | pH | 7.51 | 7.55 | 7.52 | 7.65 | 7.68 |
| | ammonium | 0.748 | 0.0052 | 0.236 | 0.338 | 0.214 |
| | COD | 76.5 | 75.7 | 75.5 | 75.3 | 76.5 |

On day 36, viz. 9 Oct. 2001, the BI5-value was 6.1. The limit is 10.0.

Finally, on days 40, 42 and 44, viz 13, 15 and 17 Oct. 2001, the following results were registered:

| | | Day | | |
|---|---|---|---|---|
| Measuring site | | 40 | 42 | 44 |
| Septic tank | pH | 7.28 | 7.39 | 7.42 |
| Sulfide in septic tank | ammonium | 71.9 | 83.6 | 83.0 |
| Intermediate settling | pH | 8.07 | 8.05 | 8.05 |
| | ammonium | 49.3 | 49.8 | 55.7 |
| Outlet | pH | 7.57 | 7.56 | 7.56 |
| | ammonium | 1.62 | 0.405 | 0.804 |
| | BI5 | | 5.04 | 7.64 |

On the entire 43$^{rd}$ day the household in which the plant is installed had been visited by 13 persons loading the plant for many hours without negatively affecting the capacity of the plant.

The invention claimed is:

1. A plant for the biological purification of waste water, said plant including in sequence a unit for decomposing organic matter, a first sludge sealing unit, a nitrification unit and a sludge settling unit, characterised in said plant includes an aerated primary settling unit prior to said units,
    wherein said plant further includes an aerated primary settling tank (1), a primary chamber (2) having an immersed bio filter (3), said bio filter being aerated by a diffuser (4) positioned beneath the filter unit, said plant further including a settling tank (5) collecting the sludge from the biological process as said sludge is fed back into the primary settling tank (1) by means of a pump system (6), and said plant further including a vertical settling tank (7), a secondary chamber (8), which in the same way as the primary chamber (2) is equipped with an immersed bio filter (3') aerated by a diffuser (4') positioned beneath the filter unit, said plant also including a secondary settling tank (9) from which purified water is discharged through an outlet.

2. A plant according to claim 1, characterised in that said primary settling unit includes means for providing aeration.

3. A plant for the biological purification of waste water, said plant including in sequence a unit for decomposing organic matter, a first sludge sealing unit, a nitrification unit and a sludge settling unit, characterised in said plant includes an aerated primary settling unit prior to said units,
    wherein said plant further includes an aerated primary settling tank (1), a primary chamber (2) having an immersed bio filter (3), said bio filter being aerated by a diffuser (4) positioned beneath the filter unit, said plant further including a settling tank (5) collecting the sludge from the biological process as said sludge is fed back into the primary settling tank (1) by means of a pump system (6), and said plant further including a vertical settling tank (7), a immersed bio filter (3') aerated by a diffuser (4') positioned beneath the filter unit, said plant also including a secondary settling tank (9) from which purified water is discharged through an outlet,
    wherein the aerated primary settling tank is divided by a partition device not extending to the bottom, includes a diffuser being positioned at the bottom for providing an air inlet, and said tank having a volume of between 50L and 25 m$^3$.

4. A plant according to claim 3, wherein said partition device is a wall or pipe.

* * * * *